United States Patent

Dulberg et al.

[11] Patent Number: 5,580,106
[45] Date of Patent: Dec. 3, 1996

[54] TRACTION DEVICE

[76] Inventors: Joel H. Dulberg, 1923 Edward La., Merrick, N.Y. 11566; Stephen E. Immonen, 85 Bethel Rd., West Paris, Me. 04289-5226

[21] Appl. No.: 506,064

[22] Filed: Jul. 24, 1995

[51] Int. Cl.$^6$ ................................................ B60B 39/00
[52] U.S. Cl. .................................................... 291/3
[58] Field of Search ................................ 291/3, 13, 18, 291/25, 41

[56] References Cited

U.S. PATENT DOCUMENTS

| | | | |
|---|---|---|---|
| 1,795,105 | 3/1931 | Buyck | 291/3 |
| 2,515,341 | 7/1950 | Giguere | 291/3 |
| 2,606,780 | 8/1952 | Loftus et al. | 291/3 |
| 2,999,711 | 9/1961 | Sturmer | 291/3 |
| 3,345,097 | 10/1967 | Smith | 291/3 |
| 4,486,039 | 12/1984 | Jayne | 291/3 |
| 4,968,069 | 11/1990 | Jensen | 291/3 |

FOREIGN PATENT DOCUMENTS

| | | | |
|---|---|---|---|
| 3742326 | 6/1989 | Germany | 291/3 |
| 8001264 | 6/1980 | WIPO | 291/3 |

*Primary Examiner*—Mark T. Le
*Attorney, Agent, or Firm*—Myron Amer, P.C.

[57] ABSTRACT

A method, using pressure air, of delivering sand from a sand box in the trunk of a car to a traction site at the interface of a car drive wheel and an ice or snow covered road surface to achieve car movement therefrom, in which the pressure air, as admittedly also occurs in the prior art, delivers the sand from the sand box to the traction site, but also significantly supplements the gravity flow of the sand from the sand box so that the amount of delivered sand to the traction site is adequate for the purposes intended, thereby overcoming a significant shortcoming of pneumatic car traction devices.

2 Claims, 2 Drawing Sheets

TRACTION DEVICE

The present invention relates generally to improvements for a sanding device to enhance the traction of rear wheel(s) of an auto in the predicament of being on ice or snow, wherein the improvements contribute to achieving effective amounts of sand deposits at a traction site, i.e. at the interface of the wheel and road surface, to correspondingly achieve traction for the stuck auto wheel(s).

EXAMPLE OF THE PRIOR ART

Auto traction-enhancing devices using a downwardly inclined conduit to direct gravity flowing sand to a deposit site at the interface of the auto wheel and road surface are described and illustrated in the prior art, but none are known to be in commercial use undoubtedly because none are effective for the purposes intended. An effort to improve the efficacy of this prior art that is pertinent to note is the traction device of U.S. Pat. No. 3,121,578 issued to Moses in February, 1964 which, to the prior art as above described, adds an inlet nozzle from a source of compressed air to the downwardly inclined conduit, but presumably only nominally improves traction since the Moses device also is not known to have been placed in use.

Broadly, it is an object of the present invention to provide a pneumatic sanding device, of the Moses type, but overcoming the foregoing and other shortcomings of the prior.

More particularly, it is an object in the operational mode of the within pneumatic sanding device to use to advantage the pressure air to not only direct the sand through a discharge conduit, but also to significantly increase the amount of the deposited sand to the extent that it establishes a traction surface that results in movement therealong by the auto wheel(s), all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
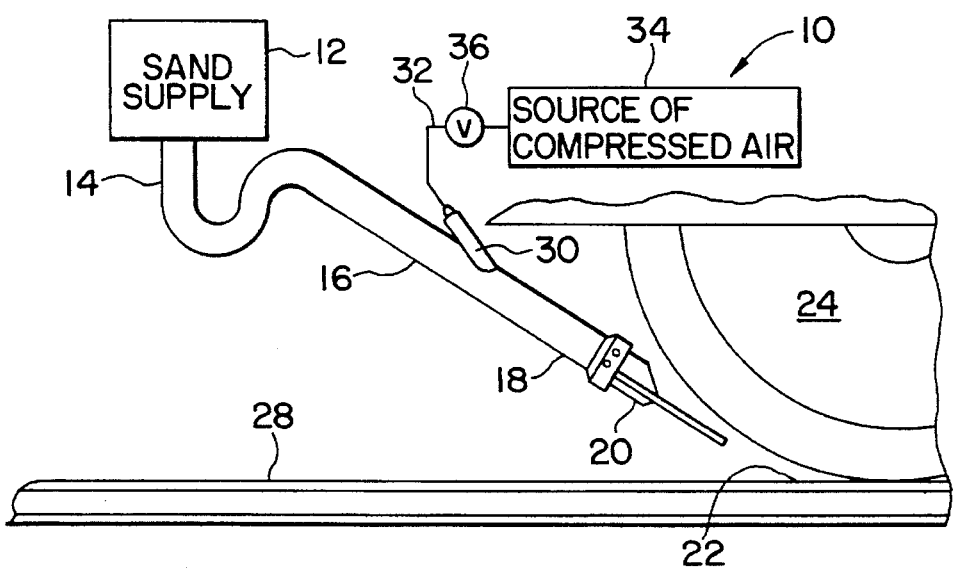
FIG. 1 is a side elevational view of a known pneumatic auto sanding device.

Pneumatic or compressed or pressure air sanding devices installed on autos to improve the traction of rear wheel(s) in the predicament of being on ice or snow are already known, as exemplified by U.S. Pat. No. 3,121,578 issued to Moses, and shown in FIG. 1. The pneumatic operating mode of such known devices often does not achieve the level or extent of traction being sought, although constructionwise the devices appear suited to do so. Using as an example the Moses sanding device, this device 10 as shown in FIG. 1 includes a sand box 12 adapted to gravity feed sand at a proximal end 14 into a downwardly inclined conduit 16 terminating in a distal end 18 at which there is positioned a valve-operated sand discharge outlet 20 adapted to discharge sand upon a traction site 22 at the interface between a rear wheel 24 of an auto 26 and a road surface 28. Supplementing the gravity flow of the sand from the proximal end 14 to the distal end 18 of the conduit 16 is an air nozzle 30 in communication via a pneumatic line 32 to a source of pressure air 34, the pressure of which is monitored in a known manner by a valve 36.

Underlying the present invention is the recognition that the shortcoming of the prior art as exemplified by device 10 is that a significant volume of the pressure air flows without effect through the sand delivery conduit 16 without pushing sand in advance thereof because the sand has not been properly positioned in the conduit to be acted upon by the exiting pressure air. Stated otherwise, for an adequate volume of sand to be deposited at a traction site 22, there must be a densified volume of sand positioned downstream of the pressure air source 34 and thus in the path of movement of the exiting pressure air so that the exiting pressure air will contact and push said densified volume of sand to the conduit discharge opening 20. This is achieved making at least one significant physical or structural change to the layout of the prior art, as shown in FIG. 1, which correspondingly achieves two significant changes in the operating mode of the within inventive device 40, as shown in FIGS. 2–5.

The referred-to physical change consists of locating the sand hopper or box 42 centrally of the layout of the device 40, so that it is via a first conduit length portion 43 in downstream relation to a pressure air source 44 and via a second conduit length portion 45 in upstream relation to a conduit discharge outlet 46. In this strategic location there is a volume of sand that will discharge by gravity flow 48 from a storage compartment 50 bounded by walls 52 of the sand box 42 through a discharge opening 54 thereof, and such gravity flow-discharged sand, denoted as at 56, will unavoidably be contacted and pushed by a pulse of pressure air, denoted by the arrow 58 through the conduit 45 and through a discharge opening 60 thereof.

In practice, however, it has been found that the volume of sand at location 56 discharging solely by gravity flow is not always adequate to achieve traction at the traction site 62. In accordance with the present invention, this gravity flow-discharged sand is significantly supplemented or densified in volume, by using to advantage the pressure air pulses 58 for this purpose. More particularly, as part of the operating mode of the within inventive device 40 of FIGS. 2–5, a part of the pressure air pulse 58 enters in a reverse ascending direction 64 through the sand box discharge opening 54, continues in this ascending direction 66 through the porosity of the particles of sand 68 stored in the sand box 42, and into the clearance space 70 above the stored sand 68, from which the pressure air exerts a back pressure 72 upon the stored sand 68 which increases the volume of sand discharging through the discharge opening 54 and being positioned at location 56, and thus provides the favorable densified condition of the sand for movement under the urgency of the pressure air 44 and for ultimate discharge through the conduit discharge opening 60.

Another significant physical change contemplated in accordance with the present invention is avoiding or obviating the descending angular orientation of the prior art conduit 16 which requires positioning a valve means at the discharge opening 20 to control sand movement therethrough. That is, without a valve means, there could be inadvertent sand discharge, since gravity flow along the angular decline is not inhibited.

Figure 2:
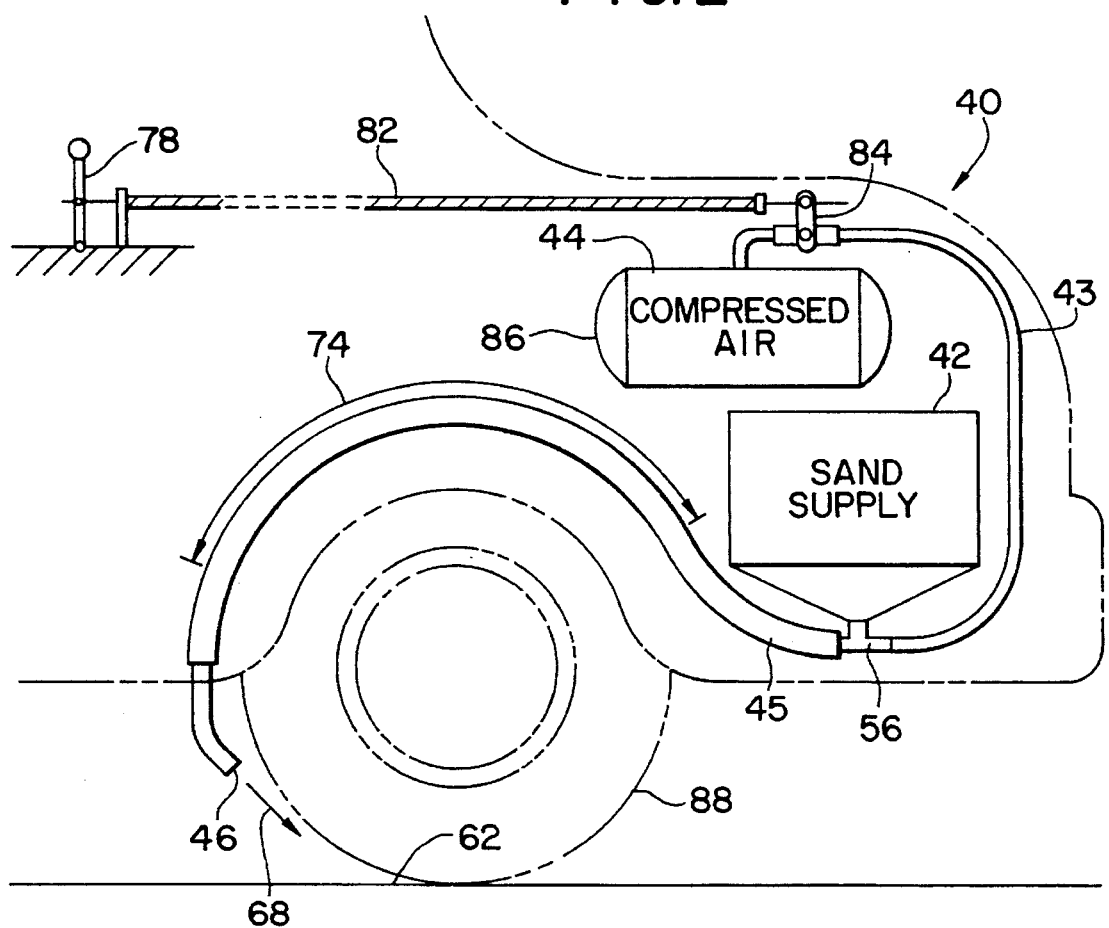
FIG. 2 is similarly a side elevational view, but of the within inventive auto sanding device shown in full line perspective and the auto in which it is installed shown in phantom perspective.
Figure 3:
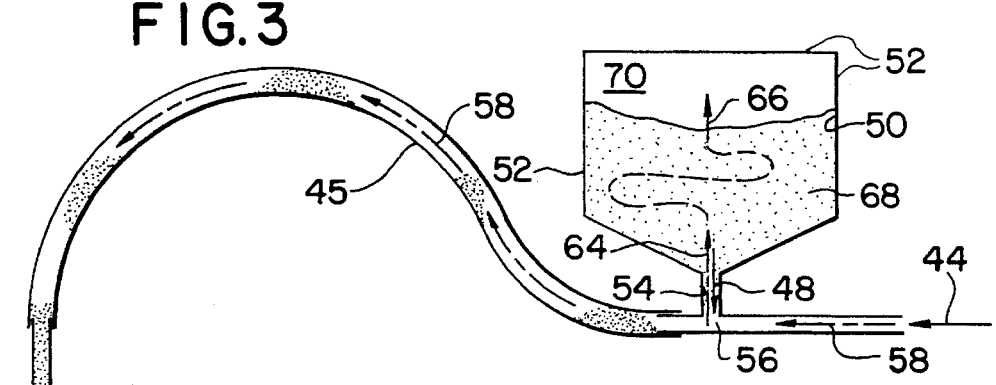
FIGS. 3 and 4 are each isolated diagrammatic views illustrating operating parameters of the FIG. 2 device.
Figure 4:
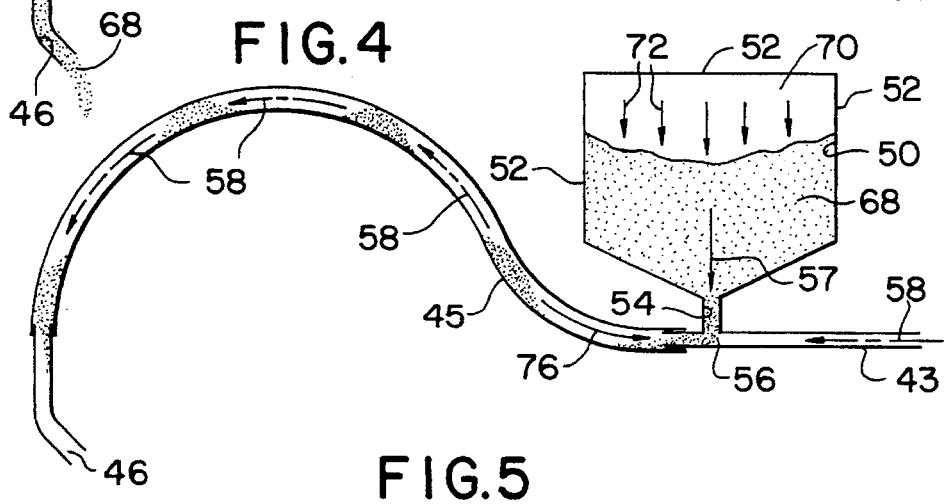

In contrast, as illustrated in FIG. 2, the layout depicted therein includes a conduit length portion 74, in an interposed position between the sand discharge location 56 and conduit discharge 60, which is of an inverted U-shaped configuration having a first encountered acute angle angular upturn, which sand at the discharge location 56 cannot surmount without the pushing assistance of the pressure air 44. In practice, it has been found that gravity flow of sand in the reverse direction 76 along the conduit length portion 74 contributes to densifying the volume of sand at the location 56, and thus further contributes to ensuring an adequate volume of discharged sand being delivered to the traction site 62 to achieve traction for the vehicle drive wheel.

For completeness' sake, reference should be made to the FIG. 2 layout of a preferred embodiment in which there is illustrated an air control lever 78 located within reach of the driver 80 (FIG. 5) of the auto connected to one end of a cable 82 in turn connected in spanning relation from the lever 78 to an air valve 84, controlling the release of the pressure air 44 in pulses 58 from a compressed air tank 86 serving as the containment of the source of the pressure air 44.

Figure 5:
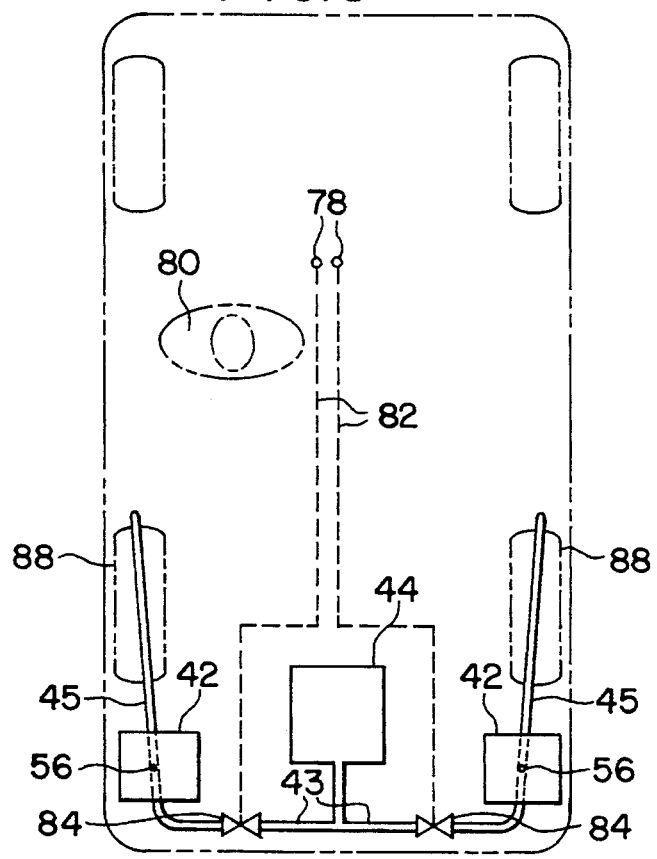
FIG. 5 is a layout, in plan view, of the within inventive auto sanding device in relation to both auto rear wheels.

FIG. 5 is the preferred layout for both auto rear left and right wheels 88 and correspondingly includes two of each of the components illustrated and described in relation to FIG. 2, except for one compressed air tank 86 which, in practice, suffices for both wheels 88.

The operating mode parameters of the within inventive sanding device 40 which in practice have provided good results contemplate use of: (1) compressed or pressure air source of 125 psi; (2) a sand hopper 42 of approximately ¾ cubic foot capacity starting with 50 lbs. of sand; (3) conduits 43, 45 of ⅝ inch inside diameter and 8 feet in length; and (4) a valve-opening pressure release using lever 78 of 1–2 seconds, the aforesaid resulting in typically 45 sand deposits of approximately 1 quart per application at the traction site 62, and a working and residual back pressure of 15 psi and a residual pressure in the tank 86 after 45 applications of 40 psi.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. An operable system for a device for causing the deposit of sand at an interface between an auto drive wheel and a road surface to improve traction therebetween, said system comprising a sand hopper adapted to be centrally disposed in said system having walls bounding a sand storage compartment with a bottom discharge opening, a source of porous sand disposed to partially fill said sand storage compartment adapted by gravity to partake of exiting flow through said storage compartment bottom discharge opening, a first length portion of a conduit having opposite proximal and distal ends and an inverted U-shaped configuration therebetween disposed in downstream relation between said sand hopper and an auto drive wheel, said first conduit length portion proximal end being connected in communication with said sand hopper bottom discharge opening and said U-shaped configuration disposed in encircling relation over a top of said auto drive wheel and said distal end located adjacent said interface between said auto drive wheel and a road surface, a second length portion of a conduit having opposite proximal and distal ends disposed in upstream relation to said sand hopper with said proximal end being connected in communication with said sand hopper bottom discharge opening, and a source of pressure air having an intermittent operating mode connected in communication with said conduit second length portion distal end effective to cause a corresponding intermittent operational mode in the release of a selected amount of pressure air through said conduit second length portion distal end, each said released amount of pressure air flowing through said conduit second length portion wherein a portion of said pressure air branches off to flow upwardly through said sand discharging in a reverse downward direction through said sand hopper bottom discharge opening and in a continuing upward direction through the porosity of said sand so as to maintain the porosity of said discharging sand and said sand in said hopper and to apply a pressure from above upon said sand effective to increase the amount thereof discharging from said sand hopper, said remaining amount of said released pressure air which does not branch off being effective to urge said discharged sand in movement through said conduit first length portion and the inverted U-shaped configuration thereof to said conduit first length portion distal end, whereby there is deposited at said interface of said auto drive wheel and road surface an optimum amount of sand contributing to enhancing the traction of said auto drive wheel.

2. The auto sanding device of the operable system as claimed in claim 1, including an acute angle angular upturn in a first encountered length portion of said U-shaped configuration of said conduit first length portion effective to cause gravity flow therealong of said sand in a direction towards said sand storage compartment bottom discharge opening, to thereby contribute to the amount of sand being urged by pressure air for deposit at said interface of said auto drive wheel and road surface.

\* \* \* \* \*